Oct. 17, 1967 J. G. COLLINS ET AL 3,347,097
MAXIMUM-MINIMUM DEPTH GAGE
Filed Feb. 26, 1965
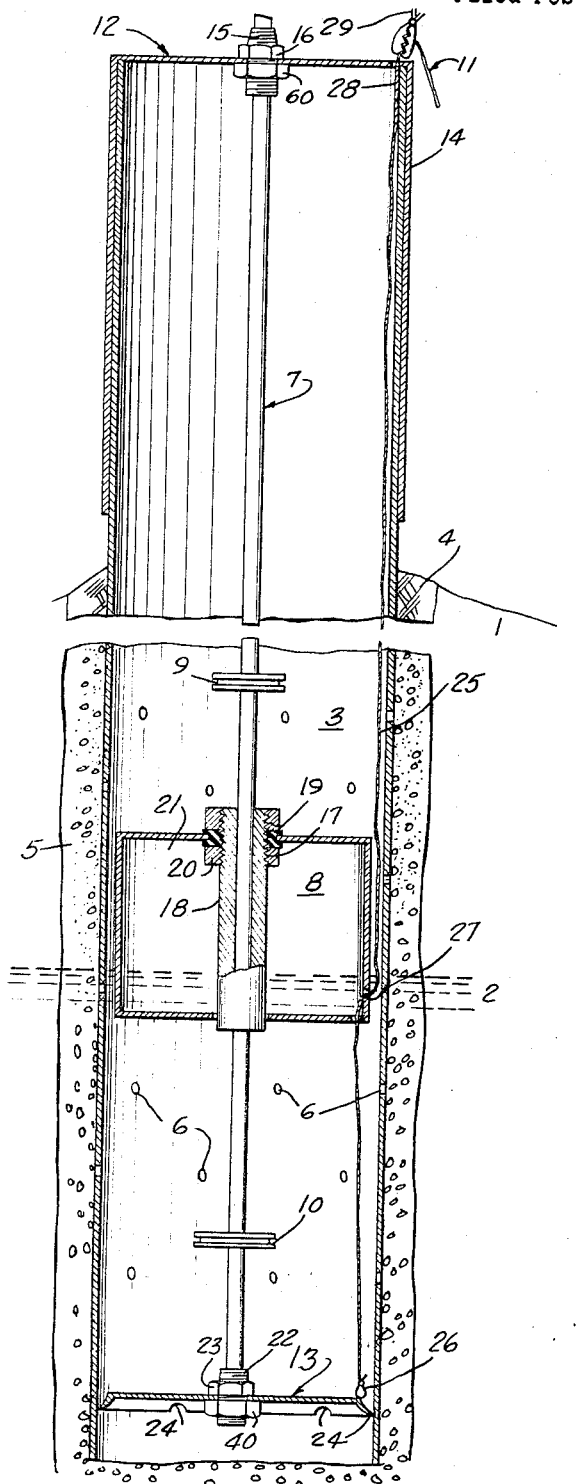
INVENTORS
BERYL G. STINSON
JOHN G. COLLINS
BY Joseph A. Hill
ATTORNEY 3,347,097
MAXIMUM-MINIMUM DEPTH GAGE
John G. Collins, Corvallis, Oreg., and Beryl G. Stinson, Vicksburg, Miss., assignors to the United States of America as represented by the Secretary of the Army
Filed Feb. 26, 1965, Ser. No. 435,752
2 Claims. (Cl. 73—315)

This invention described herein may be manufactured and used by or for the Government for governmental purposes without the payment to us of any royalty thereon.

ABSTRACT OF THE DISCLOSURE

A borehole liquid level gauge having slidable maximum and minimum indicators positioned by a float to indicate water table fluctuations. A releasable flexible float locking means having a weight at one end will prevent movement of the float when it is raised for observation.

---

This invention relates to depth gages and more particularly to a depth gage that is capable of measuring the maximum and minimum level of a fluctuating body of water and specifically the level of the water table within a bore hole. The gage consists of a support holding a depending shaft on which a float slides. Indicating means are positioned above and below the float on the shaft and locking means are provided to prevent the downward movement of the float when desired.

Since the physical properties of fine grained soils are adversely affected by the presence of water tables within 3 or 4 feet of the surface, any comprehensive trafficability prediction method must account for the presence and level fluctuations of such water tables.

In the past, data has been accumulated simply by measuring the depth of the water in an observation well at the time of periodically scheduled visits. This method does not necessarily produce the required information since the measurements rarely are taken when the water table is at its maximum or minimum level.

The use of automatic clock driven water level recorders to obtain the required data has been found unsatisfactory because of the high initial cost of the equipment, operating difficulties with the clock and pen and the need for readjusting the zero of the instrument whenever the water level changed more than a few feet. These difficulties resulted in gaps in the record and no measurement of the maximum or minimum level when the fluctuations exceeded the range of the instrument.

It is accordingly one object of this invention to provide a simple, inexpensive gage for measuring the maximum and minimum levels of a fluctuating water table.

It is another object of this invention to provide a depth gage that will indicate the maximum and minimum level of the water table over any period of time.

It is a further object of this invention to provide a depth gage that will measure the maximum and minimum levels of any fluctuating body of water.

These and other objects of the invention will be apparent from the following description of the invention with reference to the drawing wherein:

The figure is a cross-sectional view of one embodiment of the invention installed in a well bore.

The well bore that is to be sampled is drilled in the earth 1 to a depth well below the estimated minimum level of the water table 2. The bore hole is slightly larger than the well casing 3 which may be a 3" galvanized downspout and the annular space between the earth 1 and casing 3 is backed with compacted soil 4 above the maximum estimated level of the water table and with gravel 5 below that level. The portion of casing 3 contiguous with the gravel 5 is provided with perforations 6 to permit the water to readily enter casing 3.

The gage itself consists basically of a shaft 7, a float 8, maximum and minimum level indicators 9 and 10, respectively, locking means 11 for preventing downward movement of float 8 on shaft 7 and supporting means 12 for supporting the shaft 7 in the bore hole. In addition, centering means 13 may also be provided to center the gage assembly in the bore hole.

In a simple embodiment of the invention the supporting means 12 comprises a tin can 14, having one open end. The internal diameter of the can is slightly larger than the external diameter of the casing so that it may readily be slid over the upper end of casing 3. The closed end of can 14 is provided with a hole through which passes shaft 7 and shaft 7 is connected to can 14 by means of shaft collar 15, lock nut 16 and nut 60.

The float 8 may consist of a cylinder 21 open at its lower end provided with a central hole in its upper end. A rubber grommet 17 engages the edge of said hole and a threaded sleeve 18 passes through said grommet 17 and is secured therein by lock nuts 19 and 20. Sleeve 18 should be approximately as long as or slightly longer than cylinder 21 to prevent leakage of air between sleeve 18 and shaft 7 upon which sleeve 18 slides. Level indicator 9 and 10 may comprise rubber grommets whose internal diameter is such that they will slide on shaft 7 when acted upon by float 8 but will not slide under their own weight. In actual practice it has been found that when shaft 7 is a ¼" brass shaft, commercially available ¼" I.D. grommets perform satisfactorily with little or no modification. A satisfactory float for a 3" casing can readily be made from an aluminum sample can having a 2½" O.D.

The centering means 13 is merely a spider having a central hole which is held in place on the lower end of shaft 7 by means of locking shaft collar 22, lock nut 23 and nut 40. The spider may readily be made from the cover of the sample can used for the float with the lip thereof turned out at several places along the periphery as shown at 24.

Locking means 11 are provided so that the float 8 can be prevented from sliding down shaft 7 and changing the position of indicator 10 when the gage is removed from the well bore. While any means of preventing such movement can be used, the simplest and most economical form is illustrated. Locking means 11 comprises a length of a flexible supporting material, such as a fishing line 25 having a weight 26 such as a sinker fastened to its lower end. The line 25 is threaded through a small hole 27 in the wall of cylinder 21 at a point below the floating depth of float 8 and extends through a small hole 28 in supporting means 12 where it is fastened by tying or by a clamp 29, for example, an alligator clip.

In use, the gage assembly initially is lowered into operative position as shown in the well casing. The float 8 is then locked in position by pulling string 25 until weight 26 contacts float 8 and fastening string 25 with clamp 29.

The gage assembly is then withdrawn from the well bore, indicators 9 and 10 are slid into contact with the float assembly 8 and the gage assembly is then lowered back into the well bore. Weight 26 is then lowered until it contacts spider 13 and the string 25 is fastened to prevent its falling into the bore through hole 28.

To take a reading from the gage, the float is locked as described above and the gage withdrawn. The positions of indicators 9 and 10 are measured and from a knowledge of the length or sleeve 18 and the displacement depth of float 8, the actual maximum and minimum level of the water table during the measurement period can be determined. Indicators 9 and 10 are then slid into contact with float 8 and the gage assembly reinserted. The float is released as set forth above and the gage is ready for taking another set of readings.

In the embodiment shown the supporting means also serves to cover the bore hole and prevents rain, which may affect the water level, from entering. If different supporting means are used, it may be necessary to shield the bore hole from rain.

While this invention has been disclosed with respect to a preferred embodiment thereof, the invention includes mechanical modifications and the substitution of equivalent means for those shown in the specific embodiment and is limited only by the following claims.

We claim:
1. A gage for measuring the maximum and minimum levels of a fluctuating body of water in a bore hole comprising:
   (a) a well casing inserted in the bore hole extending from a point above the surface of the earth to a point below the minimum level of the water table, said well casing being perforated along the lower portion;
   (b) a cylindrical member, closed at its upper end, said member being capable of receiving the upper end of said well casing;
   (c) a shaft mounted on said closed upper end of said cylindrical member and extending downwardly along the axis of said cylindrical member;
   (d) centering means for centering said shaft within the bore hole;
   (e) a float slidably mounted on said shaft;
   (f) indicating means mounted on said shaft above and below said float, said indicating means being slidably mounted on said shaft when activated by said float and being incapable of motion when acted on by their own weight; and
   (g) releasable locking means for preventing movement of said float on said shaft.
2. The apparatus of claim 1 wherein:
   (a) said upper end of said cylinder is provided with a small opening,
   (b) said locking means comprises a flexible supporting member extending through said small opening, said flexible supporting member being provided with a weight at its lower end and means are provided for preventing movement of said flexible supporting member through said hole; and
   (c) said float means is slidably engaged with said flexible supporting member and adapted to abut said weight whereby said float means is free to slide downwardly on said shaft until contact is made with said weight.

References Cited

UNITED STATES PATENTS

| 1,653,759 | 12/1927 | Caretta | 73—314 |
| 2,381,875 | 8/1945 | Bryant | 73—151 |
| 2,921,470 | 1/1960 | Molat | 73—311 |

FOREIGN PATENTS

| 115,472 | 11/1899 | Germany. |
| 10,885 | 7/1890 | Great Britain. |
| 120,414 | 11/1918 | Great Britain. |
| 272,058 | 6/1927 | Great Britain. |

LOUIS R. PRINCE, *Primary Examiner.*

DAVID SCHONBERG, *Examiner.*

D. M. YASICH, *Assistant Examiner.*